United States Patent [19]

Davis

[11] Patent Number: 5,124,136

[45] Date of Patent: * Jun. 23, 1992

[54] SYNTHESIS OF CRYSTALLINE METALLOLUMINOPHOSPHATE COMPOSITION

[75] Inventor: Mark E. Davis, Blacksburg, Va.

[73] Assignee: Mobil Oil Corporation, Fairfax, Va.

[*] Notice: The portion of the term of this patent subsequent to Apr. 28, 2009 has been disclaimed.

[21] Appl. No.: 543,634

[22] Filed: Jun. 26, 1990

[51] Int. Cl.$^5$ .................................. C01B 25/36
[52] U.S. Cl. ...................... 423/305; 423/328; 423/277; 502/208; 502/214; 208/46; 208/115; 208/111; 208/143; 208/213; 585/509; 585/502; 585/733; 55/75
[58] Field of Search ............. 423/305, 306, 328, 329, 423/330, 326, 277, 279; 502/214, 208; 208/45, 46, 135, 111, 143, 213; 585/509, 502, 733; 55/75

[56] References Cited

U.S. PATENT DOCUMENTS

| | | | |
|---|---|---|---|
| 4,440,871 | 4/1984 | Lok et al. | 502/214 |
| 4,500,651 | 2/1985 | Lok et al. | 502/208 |
| 4,567,029 | 1/1986 | Wilson et al. | 423/306 |
| 4,619,818 | 10/1986 | Derouane et al. | 423/306 |
| 4,623,527 | 11/1986 | Derouane et al. | 423/306 |
| 4,632,811 | 12/1986 | Derouane et al. | 423/306 |
| 4,639,357 | 1/1987 | Derouane et al. | 423/306 |
| 4,639,358 | 1/1987 | Derouane et al. | 423/306 |
| 4,647,442 | 3/1987 | Derouane et al. | 423/306 |
| 4,664,897 | 5/1987 | Derouane et al. | 423/306 |
| 4,673,559 | 6/1987 | Derouane et al. | 423/306 |
| 4,713,227 | 12/1987 | Derouane et al. | 423/305 |
| 4,880,611 | 11/1989 | von Ballmoos et al. | 423/306 |

FOREIGN PATENT DOCUMENTS

WO89/01912  3/1989  PCT Int'l Appl. .

OTHER PUBLICATIONS

Lok et al., Zeolites, 1983, vol. 3, pp. 282-291.

Primary Examiner—R. Bruce Breneman
Attorney, Agent, or Firm—Alexander J. McKillop; Charles J. Speciale; Laurence P. Hobbes

[57] ABSTRACT

Crystalline metalloaluminophosphate compositions having pore windows formed by 18 tetrahedral members are prepared from a forming mixture containing sources of aluminum, phosphorus and a non-aluminum, non-phosphorus element, e.g. boron or boron and silicon. The forming mixture further contains a directing agent comprising a mixture of quaternary nitrogen compound and amine in a molar ratio of 0.01 to 0.025.

17 Claims, 1 Drawing Sheet $^{11}$B NMR Spectrum of the Product from Experiment E.

FIGURE. ¹¹B NMR Spectrum of the Product from Experiment E.

SYNTHESIS OF CRYSTALLINE METALLOLUMINOPHOSPHATE COMPOSITION

CROSS-REFERENCE TO RELATED APPLICATIONS

This application is related by subject matter to U.S. Application Ser. No. 07/543,633, filed on even date herewith.

BACKGROUND OF THE INVENTION

1. Field of the Invention

This invention relates to a new and useful improvement in synthesizing a crystalline metalloaluminophosphate composition from a reaction mixture containing a specific new directing agent, hereinafter more particularly defined, the new crystalline composition synthesized, and to use of the crystalline composition synthesized in accordance herewith as a catalyst component for organic compound, e.g. hydrocarbon compound, conversion.

More particularly, this invention relates to an improved method for preparing a crystalline metalloaluminophosphate composition from a forming mixture containing a directing agent comprising a quaternary nitrogen compound and amine in a molar ratio of 0.01 to 0.025. The addition of small amounts of quaternary nitrogen compound to the forming mixture results in a product comprising crystals having large pore windows measuring greater than about 10 Angstroms in diameter, such as, for example, greater than about 12 Angstroms in diameter, having enhanced thermal stability over compositions made from amine alone as directing agent.

2. Discussion of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-38 (U.S. Pat. No. 4,046,859), and zeolite ZSM-23 (U.S. Pat. No. 4,076,842) merely to name a few.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms to tridymite, is the "$H_1$" phase or hydrate of aluminum phosphate of F. d'Yvoire, *Memoir Presented to the Chemical Society*, No. 392, "Study of Aluminum Phosphate and Trivalent Iron", Jul. 6, 1961 (received), pp. 1762–1776. This material, when crystalline, is identified by the Joint Commission for Powder Diffraction Standards (JCPDS), card number 15-274, and has an X-ray diffraction pattern exhibiting lines of Tables 1A, 1B and 1C, hereinafter presented. Once heated at about 110° C., however, the d'Yvoire material becomes amorphous or transforms to tridymite.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. No. 4,673,559 (two-phase synthesis method); U.S. Pat. No. 4,623,527 (MCM-10); U.S. Pat. No. 4,639,358 (MCM-1); U.S. Pat. No. 4,647,442 (MCM-2); U.S. Pat. No. 4,664,897 (MCM-4); U.S. Pat. No. 4,639,357 (MCM-5) and U.S. Pat. No. 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651. These methods utilize directing agents different from that required of the present invention.

The phosphorus-substituted zeolites of Canadian Patents 911,416; 911,417 and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550 and 3,697,550.

Lok et al (Zeolites, 1983, Vol. 3, Oct., 282-291) teach numerous organic compounds which act as directing agents for synthesis of various crystalline materials, such as, for example, ZSM-5, ZSM-11, ZSM-12, ZSM-20, ZSM-35, ZSM-48, AlPO$_4$-5, AlPO$_4$-8, AlPO$_4$-20 and others. The article does not show use of the presently required directing agent compound for synthesis of the silicoaluminophosphate composition of this invention. ZSM-5 and AlPO$_4$-5 are taught by Lok et al to be directed by tetrapropylammonium hydroxide from appropriate reaction mixtures. Choline compounds are taught to direct synthesis of ZSM-34, ZSM-38, ZSM-43, AlPO$_4$-5 and AlPO$_4$-7.

Other publications teaching various organic directing agents for synthesis of various crystalline materials include, for example, U.S. Pat. No. 4,592,902, teaching use of an alkyltropinium directing agent, alkyl being of 2 to 5 carbon atoms, for synthesis of ZSM-5; U.S. Pat. No. 4,640,829, teaching use of dibenzyldimethylammonium directing agent for synthesis of ZSM-50; U.S. Pat. No. 4,637,923, teaching use of $(CH_3)_2(C_2H_5)N^+(CH_2)_4N^+(C_2H_5)(CH_3)_2$ directing agent for synthesis of a novel zeolite; U.S. Pat. No. 4,585,747, teaching use of bis (N-methylpyridyl) ethylinium directing agent for synthesis of ZSM-48; U.S. Pat. No. 4,585,746, teaching use of bis (N-methylpyridyl) ethylinium directing agent for synthesis of ZSM-12; U.S. Pat. No. 4,584,286, teaching use of bis (N-methylpyridyl) ethylinium directing agent for synthesis of ZSM-35; U.S. Pat. No. 4,568,654, teaching use of cobalticinium, dimethylpiperidinium, trimethylene bis trimethylammonium or tetramethylpiperazinium directing agents for synthesis of ZSM-51; U.S. Pat. No. 4,559,213, teaching use of DABCO-C$_{4-10}$-diquat directing agent for synthesis of ZSM-12; U.S. Pat. No. 4,482,531, teaching synthesis of ZSM-12 with a DABCO-C$_n$-diquat, n being 4,5,6 or 10, directing agent; and U.S. Pat. No. 4,539,193, teaching use of bis (dimethylpiperidinium) trimethylene directing agent for synthesis of ZSM-12.

U.S. Pat. No. 4,139,600 teaches a method for synthesis of zeolite ZSM-5, having a structure different from the presently synthesized crystal, from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonimum hydroxide, and ethanol, ammonimum hydroxide and ZSM-5 seeds. U.S. Pat. No. 4,100,262 teaches synthesis of ZSM-5 from a reaction mixture comprising a tetraalkylammonium source and a tetraureacobalt (II) complex.

Various diquaternary ammonium compounds have been identified as directing agents for a various assortment of crystalline materials. For instance, U.S. Pat. Nos. 4,490,342 and 4,619,820 show synthesis of ZSM-23 from a reaction mixture containing the organic of U.S. Pat. No. 4,531,012, i.e. $(CH_3)_3N^+(R)N^+(CH_3)_3$, where R is a saturated or unsaturated hydrocarbon having 7 carbon atoms. U.S. Pat. No. 4,623,527 teaches numerous diquaternary ammonium compounds and shows use of $(CH_3)_3N^+(CH_2)_7N^+(CH_3)_3$ directing agent for synthesis of MCM-10.

U.S. Pat. No. 4,632,815 teaches numerous diquaternary ammonium compounds and shows use of $(CH_3)_3N^+(CH_2)_4N^+(CH_3)_3$ to direct synthesis of a Silica-X structure type. U.S. Pat. No. 4,585,639 teaches use of the diquaternary $(C_2H_5)(CH_3)_2N^+(CH_2)_{4 or 6}N^{30}(CH_3)_2(C_2H_5)$ as directing agent for synthesis of ZSM-12. Synthesis of ZSM-5 is directed by the diquaternary $(alkyl)_3N^+(CH_2)_6N^{30}(alkyl)_3$, alkyl being propyl or butyl, in U.S. Pat. No. 4,585,638.

EPA 42,226 and U.S. Pat. No. 4,537,754 teach existence of numerous diquaternary ammonium compounds, but show use of $(CH_3)_3N^+(CH_2)_6N^+(CH_3)_3$ as directing agent for synthesis of EU-1. EPA 51,318 teaches use of the same diquaternary for synthesis of TPZ-3. It is noted that EU-1, TPZ-3 and ZSM-50 have the same structure.

U.S. Pat. No. 4,440,871 to Lok et al. teaches the preparation of silicoaluminophosphate compositions from a forming mixture containing a templating agent of mono-, di-, tri-amines either alone or in combination with a quaternary ammonium compound or other templating compound, e.g., SAPO-11 from a mixture of tetra-n-butylammonium hydroxide and di-n-propylamine. PCT application WO 89/01912 to Davis et al.,published Mar. 9, 1989, discloses the preparation of large pore crystalline aluminumphosphate compositions from forming mixtures containing structure-directing agents such as dipropylamine, diisopropylamine, tetrapropylammonium hydroxide, tetrabutylammonium hydroxide, dipentylamine, tripentylamine, tributylamine, alkylammonium and alkylphosphonium compounds in general, and mixtures of these; however, no guidance concerning the ratio of amines to ammonium compounds is given.

SUMMARY OF THE INVENTION

An improved, economical and reproducible hydrothermal synthesis method for preparing crystalline metalloaluminophosphate exhibiting valuable properties is provided. The method comprises forming a reaction mixture hydrogel containing sources of aluminum, phosphorus, non-aluminum, non-phosphorus element M, hereinafter more particularly described, directing agent, and water and having a composition, in terms of mole ratios, within the following ranges:

|  | Broad | Preferred | Most Preferred |
| --- | --- | --- | --- |
| $M/Al_2O_3$ | 0.01 to 0.4 | 0.01 to 0.2 | 0.01 to 0.1 |
| $P_2O_5/Al_2O_3$ | 0.5 to 1.25 | 0.9 to 1.1 | 0.9 to 1.1 |
| $H_2O/Al_2O_3$ | 10 to 100 | 30 to 80 | 35 to 60 |
| $DA/Al_2O_3$ | 0.5 to 1.5 | 0.9 to 1.1 | 0.9 to 1.1 | where DA is the directing agent, hereinafter more particularly defined, and maintaining the mixture until crystals of the desired crystalline composition are formed.

Reaction conditions required of the instant invention are critical and consist of heating the foregoing reaction mixture to a temperature of from about 100° C. to less than about 160° C. for a period of time of from about 1 hour to less than about 80 hours. A more preferred temperature range is from about 130° C. to about 150° C. with the amount of time at a temperature in such range being from about 5 hours to about 80 hours. If the temperature is higher than about 160° C. and/or the time exceeds about 80 hours, the product composition will be diminished of desired large pore crystals characterized by the X-ray diffraction patterns of Tables 1A, 1B and 1C, hereinafter presented. Also critical of this synthesis procedure is the reaction mixture ratio of $P_2O_5/Al_2O_3$. When the ratio $P_2O_5/Al_2O_3$ plus other trivalent metal oxide, if present (including $B_2O_3$), is greater than about 1.25, especially when the temperature is higher than 160° C., product composition will be diminished of desired large pore crystals characterized by the X-ray diffraction patterns of Tables 1A, 1B and 1C, hereinafter presented.

The solid product composition comprising the desired metalloaluminophosphate is recovered from the reaction medium, as by cooling the whole to room temperature, filtering and water washing.

EMBODIMENTS

Figure 1:
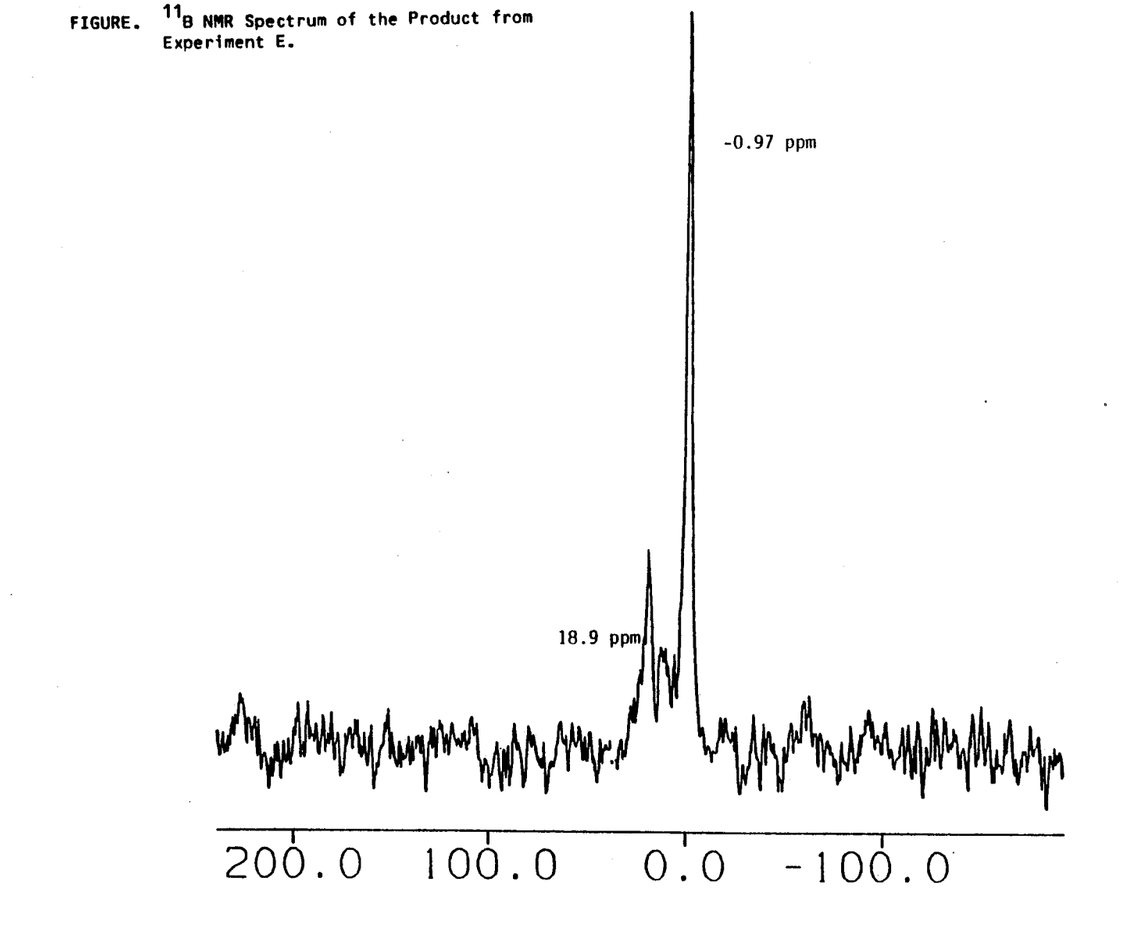
The FIGURE depicts the $^{11}B$ NMR spectrum of a metalloaluminophosphate prepared from a forming mixture containing sources of silicon oxide and sources of boron oxide.

The crystalline metalloaluminophosphate composition synthesized in accordance with the present method exhibits utility as a catalyst component for certain chemical reactions of interest, including cracking, hydrocracking, disproportionation, alkylation, isomerization and oxidation.

The amines comprising the organic directing agent may be selected from the group consisting of mono-, di-, tri- or polyamines. Particularly preferred amines include alkylamines, e.g., those wherein alkyl is of 1 to 5 carbon atoms. Exemplary amines include those selected from the group consisting of di-n-propylamine, di-isopropylamine, di-n-pentylamine, di-isopentylamine, di-n-pentylamine, tri-n-butylamine, tri-n-pentylamine and trialkanolamines, e.g., triethanolamine and tri-isopropanolamine.

The quaternary nitrogen compounds used in the organic directing agent of the present invention comprise ammonium compounds having the formula:

wherein R is alkyl of from 1 to 20 carbon atoms, heteroalkyl of from 1 to 20 atoms, aryl, heteroaryl, cycloalkyl of from 3 to 6 carbon atoms, cycloheteroalkyl of from 3 to 6 carbon atoms, or combinations thereof; and X is an anion (e.g., fluoride, chloride, bromide, iodide, hydroxide, acetate, sulfate, carboxylate, etc.). Preferred quaternary nitrogen compounds used in making up the directing agent of the present invention include those of the above formula wherein R is alkyl of from 1 to 4 carbon atoms and X is halide or hydroxide. Such quaternary nitrogen compounds include those wherein the cation is selected from the group consisting of tetramethylammonium, tetraethylammonium, tetra-n-propylammonium and tetra-n-butylammonium.

The molar ratio of quaternary nitrogen compound to amine ranges from 0.01 to 0.025. Preferably, such molar ratio ranges from 0.01 to 0.020; even more preferably from 0.015 to 0.018. The present invention is particularly useful in that it results in the preparation of the above-mentioned stable crystalline compositions while using reduced amounts of expensive quaternary nitrogen compounds avoiding the instability associated with crystalline compositions prepared from a pure amine directing agent.

The synthesis of the present invention may be facilitated when the reaction mixture comprises seed crystals, such as those having the structure of the product crystals. The use of at least 0.01%, preferably about 0.10%, and even more preferably about 1% seed crystals (based on total weight) of crystalline material in the reaction mixture will facilitate crystallization in the present method.

The reaction mixture composition for the synthesis of synthetic crystalline metalloaluminophosphate hereby can be prepared utilizing materials which can supply the appropriate oxide. The useful sources of aluminum oxide include, as non-limiting examples, any known form of aluminum oxide or hydroxide, organic or inorganic salt or compound, e.g. alumina and aluminates. Such sources of aluminum oxide include pseudo-boehmite and aluminum tetraalkoxide. The useful sources of phosphorus oxide include, as non-limiting examples, any known form of phosphorus acids or phosphorus oxides, phosphates and phosphites, and organic derivatives of phosphorus. The useful sources of element M include, as non-limiting examples, any known form of non-aluminum, non-phosphorus element, e.g. metal, its oxide or hydride or salt, alkoxy or other organic compound containing M. Where M comprises boron, suitable sources of boron include any form of boron oxide or hydroxide, organic or inorganic salt or compound of boron. Where M comprises silicon, useful sources include silicon oxides such as, e.g., any known form of silicic acid or silicon dioxide, alkoxy- or other compounds of silicon, including silica gel and silica hydrosol. Such sources of silicon oxide include amorphous precipitated silica, e.g., Ultrasil ™, fumed silica, and colloidal silica.

It will be understood that each oxide component utilized in the reaction mixture for preparing the present crystalline composition can be supplied by one or more essential reactants and they can be mixed together in any order. For example, any oxide can be supplied by an aqueous solution. The reaction mixture can be prepared either batchwise or continuously. Crystal size and crystallization time for the product composition comprising the desired metalloaluminophosphate will vary with the exact nature of the reaction mixture employed within the above-described limitations.

The metalloaluminophosphate composition synthesized hereby is characterized by a composition in which the number of atoms of aluminum and phosphorus is greater than the number of atoms of non-aluminum, non-phosphorus element plus any silicon, hereinafter more particularly defined and presented as "M", i.e. Al+P>M. It is named "metalloaluminophosphate" in view of its crystalline composition and of the charge distribution on its framework tetrahedral T-sites. The characteristic composition of this material, in the anhydrous state and as synthesized, is as follows:

$$DA_v:(AlO_2^-)_{1-x}:(PO_2^+)_{1-y}:(MO_2^{m-4})_{x+y}$$

wherein v is the number of moles of DA, occluded organic material resulting from the above-described organic directing agent used in synthesis of and filling microporous voids of the metalloaluminophosphate, which material may be removed upon calcination, and M is one or more elements of valence m (weighted average) selected from the group consisting of certain non-aluminum, non-phosphorus elements and combinations thereof with $Si^{+4}$, and wherein less than about 50% of the atoms of M are $Si^{+4}$, and x and y are numbers which satisfy the relationship:

$$z=y-x+(4+m)\cdot(x+y)$$

wherein z is a number of from greater than −1 to less than +1. When z is greater than 0, the metalloaluminophosphate will mostly behave as a cation exchanger with potential use as an acidic catalyst. When z is less than 0, the metalloaluminophosphate will mostly behave as an anion exchanger with potential use as a basic catalyst.

The silicon/other element ratio for M will be from about 0, e.g. 0.0005, to less than about 0.5. Non-limiting examples of the composition of M include where up to about 99.95% of the atoms of M are $Ti^{+3}$, and where about 100% of the atoms of M are $Sb^{+3}$.

The composition of the metalloaluminophosphate, following removal of the organic component, for example by calcination, is the following:

$$(AlO_2^-)_{1-x}:(PO_2^+)_{1-y}:(MO_2^{m-4})_{x+y}$$

where all symbols and letters have their aforementioned meanings. In one embodiment M is boron alone or silicon and boron in the ratio of 0 to less than about 0.5. The metalloaluminophosphate synthesized hereby will exhibit an ion-exchange capacity of at least about 0.002 meq/g.

The element M is characterisized by its oxidation number of from +2 to +6, and its ionic "Radius Ratio" which is in the range of 0.15 to 0.73. When the oxidation number of M is +2, the Radius Ratio of the element M must be from 0.52 to 0.62.

The term "Radius Ratio" is defined as the ratio of the crystal ionic radius of the element M to the crystal ionic radius of the oxygen anion, $O^{-2}$.

$$\text{Radius Ratio} = \frac{\text{crystal ionic radius of the element } M}{\text{crystal ionic radius of } O^{-2}}$$

The crystal ionic radii of elements are listed in the CRC Handbook of Chemistry and Physics, 61st edition, CRC Press, Inc., 1980, pages F-216 and F-217, said listing incorporated herein by reference. In determining the Radius Ratio, it is necessary to use crystal ionic radii of the M atom and oxygen anion ($O^{-2}$) which have been measured by the same method.

Non-limiting examples of element M useful herein include:

| M | Valence | Radius Ratio |
|---|---|---|
| As | +3 | 0.44 |
| B | +3 | 0.17 |
| Bi | +3 | 0.73 |
| Co | +2 | 0.55 |
| Cu | +2 | 0.54 |
| Fe | +2 | 0.56 |
| Fe | +3 | 0.48 |
| Ge | +2 | 0.55 |
| Ge | +4 | 0.40 |
| In | +3 | 0.61 |
| Mn | +2 | 0.61 |
| Sb | +3 | 0.57 |
| Sn | +4 | 0.54 |
| Ti | +3 | 0.58 |
| Ti | +4 | 0.52 |
| V | +3 | 0.56 |
| V | +4 | 0.48 |
| V | +5 | 0.45 |
| Zn | +2 | 0.56 |

Non-limiting example of elements not included as M of the present invention include:

| Element | Valence | Radius Ratio |
|---|---|---|
| B | +1 | 0.26 |
| Ba | +1 | 1.16 |
| Ba | +2 | 1.02 |
| Ce | +3 | 0.78 |
| Cd | +1 | 0.86 |
| Cd | +2 | 0.73 |
| Cr | +1 | 0.61 |
| Cr | +2 | 0.67 |
| Cu | +1 | 0.73 |
| La | +1 | 1.05 |
| Mg | +1 | 0.62 |
| Mg | +2 | 0.50 |
| Mo | +1 | 0.70 |
| Sn | +2 | 0.70 |
| Sr | +2 | 0.85 |
| Th | +4 | 0.77 |
| Ti | +1 | 0.73 |
| Ti | +2 | 0.71 |
| Zn | +1 | 0.67 |

As synthesized, in general, the crystalline composition comprises structural aluminum, phosphorus and element M, and will exhibit an M/(aluminum plus phosphorus) atomic ratio of less than unity and greater than zero, and usually within the range of from about 0.001 to about 0.99. The phosphorus/aluminum atomic ratio of such materials may be found to vary from about 0.01 to about 100.0, as synthesized.

In one preferred embodiment, the metalloaluminophosphate is made from a forming mixture containing sources of boron and optionally, silicon. The resulting product contains boron and optionally, silicon within its framework. The reaction mixture for such embodiment is a hydrogel containing sources of aluminum, phosphorus, boron, optionally, silicon; directing agent (DA), and water and having a composition, in terms of mole ratios, within the following ranges:

|  | Broad | Preferred | Most Preferred |
|---|---|---|---|
| $B_2O_3/Al_2O_3$ | >0 to 0.8 | 0.01 to 0.2 | 0.01 to 0.1 |
| $P_2O_5/Al_2O_3 + B_2O_3$ | 0.5 to 1.25 | 0.9 to 1.1 | 0.9 to 1.1 |
| $H_2O/Al_2O_3$ | 10 to 100 | 30 to 80 | 35 to 60 |
| $DA/Al_2O_3$ | 0.5 to 1.5 | 0.9 to 1.1 | 0.9 to 1.1 | where DA is the directing agent, as defined above, and maintaining the mixture until crystals of the desired crystalline boroaluminophosphate composition are formed. Such boroaluminophosphate compositions, owing to the presence of framework boron will exhibit enhanced stability attributable to the reduced bond angle for B—O—B of 128° C. which is significantly less than Al—O—P or Si—O—Si bond angles. Moreover, the presence of boron in the framework can facilitate the substitution of other elements within the framework which imparts new and useful catalytic characteristics to such compositions.

The crystalline composition resulting from the present method comprises crystals having a framework topology which exhibit, even after being heated at 110° C. or higher, a characteristic X-ray diffraction pattern having the following characteristic values:

TABLE 1A

| Interplanar d-Spacings (A) | Relative Intensity |
|---|---|
| 16.4 ± 0.2 | vs |
| 8.2 ± 0.1 | w |
| 4.74 ± 0.05 | w | and more specifically the following characteristic values:

TABLE 1B

| Interplanar d-Spacings (A) | Relative Intensity |
|---|---|
| 16.4 ± 0.2 | vs |
| 8.2 ± 0.1 | w |
| 6.21 ± 0.05 | w |
| 6.17 | |
| 5.48 ± 0.05 | w |
| 4.74 ± 0.05 | w | and even more specifically the following characteristic values:

TABLE 1C

| Interplanar d-Spacings (A) | Relative Intensity |
|---|---|
| 16.4 ± 0.2 | vs |
| 8.2 ± 0.1 | w |
| 6.21 ± 0.05 | w |
| 6.17 | |
| 5.48 ± 0.05 | w |
| 4.74 ± 0.05 | w |
| 4.10 ± 0.04 | w |
| 4.05 ± 0.04 | w |
| 3.96 ± 0.04 | w |
| 3.94 | |
| 3.76 ± 0.03 | w |
| 3.28 ± 0.03 | w |

The X-ray diffraction lines in Tables 1A, 1B and 1C identify a crystal framework topology in the composition exhibiting large pore windows of 18-membered ring size. The pores are at least about 10 Angstroms in diameter, such as for example at least about 12 Angstroms, e.g. 12-13 Angstroms, in diameter. These lines distinguish this topology from other crystalline aluminosilicate, aluminophosphate and silicoaluminophosphate structures. It is noted that the X-ray pattern of the present composition is void of a d-spacing value at 13.6-13.3 Angstroms with any significant intensity relative the strongest d-spacing value. If a d-spacing value in this range appears in a sample of the present composition, it is due to impurity and will have a weak relative intensity. An 18-membered ring aluminophosphate structure was published by M. Davis, D. Saldarriaga, C. Montes and J. Garces at the "Innovation in Zeolite Materials Science" meeting in Nieuwpoort, Belgium, Sep. 13-17, 1987. The large pore "AlPO$_4$-8" of U.S. Pat. No. 4,310,440 has a d-spacing value at 13.6-13.3 Angstroms with a medium-very strong relative intensity as reported in the patent. The d'Yvoire aluminumphosphate identified above, i.e. JCPDS card number 15-274, is not crystalline or transforms to tridymite after being heated at about 110° C.

These X-ray diffraction data were collected with conventional X-ray systems, using copper K-alpha radiation. The positions of the peaks, expressed in degrees 2 theta, where theta is the Bragg angle, were determined by scanning 2 theta. The interplanar spacings, d, measured in Angstrom units (A), and the relative intensities of the lines, $I/I_o$, where $I_o$ is one-hundredth of the intensity of the strongest line, including subtraction of the background, were derived. The relative intensities are given in terms of the symbols vs=very strong (75-100%), s=strong (50-74%), m=medium (25-49%) and w=weak (0-24%). It should be understood that this X-ray diffraction pattern is characteristic of all the species of the present compositions. Ion exchange of cations with other ions results in a composition which reveals substantially the same X-ray diffraction pattern with some minor shifts in interplanar spacing and variation in relative intensity. Relative intensity of individual lines may also vary relative the strongest line when the composition is chemically treated, such as by dilute acid treatment. Other variations can occur, depending on the composition component ratios of the particular sample, as well as its degree of thermal treatment. The relative intensities of the lines are also susceptible to changes by factors such as sorption of water, hydrocarbons or other components in the channel structure. Further, the optics of the X-ray diffraction equipment can have significant effects on intensity, particularly in the low angle region. Intensities may also be affected by preferred crystallite orientation.

While the improved crystalline composition of the present invention may be used as a catalyst component in a wide variety of organic compound, e.g. hydrocarbon compound, conversion reactions, it is notably useful in the processes of cracking, hydrocracking, isomerization and reforming. Other conversion processes for which the present composition may be utilized as a catalyst component include, for example, dewaxing.

The crystalline metalloaluminophosphate composition prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the crystalline composition such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

The present composition, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized composition can be prepared by heating same at a temperature of from about 200° C. to about 550° C. for from 1 hour to about 48 hours.

As above mentioned, synthetic metalloaluminophosphate prepared in accordance herewith can have original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths and metals from Groups IIA, IIIA, IVA, IB, IIB, IIIB, IVB, VIB AND VIII of the Periodic Table of Elements, especially Mn, Ca, Mg, Zn, Cd, Pd, Ni, Cu, Ti, Al, Sn, Fe and Co.

Typical ion exchange technique would be to contact the synthetic material with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the metalloaluminophosphate composition is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

The crystalline material prepared by the instant invention may be formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst comprising the present material is molded, such as by extrusion, the material can be extruded before drying or dried or partially dried and then extruded.

In the case of many catalysts, it may be desired to incorporate the hereby prepared metalloaluminophosphate with another material resistant to the temperatures and other conditions employed in certain organic conversion processes. Such matrix materials include active and inactive materials and synthetic or naturally occurring zeolites as well as incorganic materials such as clays, silica and/or metal oxides, e.g. alumina. The latter may be either naturally occurring or in the form of gelatinous precipitates, sols or gels including mixtures of silica and metal oxides. Use of a material in conjunction with the present metalloaluminophosphate, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized metalloaluminophosphate include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the crystals hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalyst comprising the composition of this invention containing a hydrogenation component, reforming stocks can be reformed employing a temperature between 450° C. and 550° C. The pressure can be between 50 and 500 psig, but is preferably between 100 and 300 psig. The liquid hourly space velocity is generally between 0.1 and 10 $hr^{-1}$, preferably between 1 and 4 $hr^{-1}$ and the hydrogen to hydrocarbon mole ratio is generally between 1 and 10, preferably between 3 and 5.

A catalyst comprising the present composition can also be used for hydroisomerization of normal paraffins, when provided with a hydrogenation component, e.g. platinum. Hydroisomerization is carried out at a temperature between 250° C. to 450° C., preferably 300° C. to 425° C., with a liquid hourly space velocity between 0.1 and 10 $hr^{-1}$, preferably between 0.5 and 4 $hr^{-1}$, employing hydrogen such that the hydrogen to hydrocarbon mole ratio is between 1 and 10. Additionally, the catalyst can be used for olefin or aromatics isomerization employing temperatures between 0° C. and 550° C.

A catalyst comprising the metalloaluminophosphate of this invention can also be used for reducing the pour point of gas oils. This process is carried out at a liquid hourly space velocity between about 0.1 and about 5 hr$^{-1}$ and a temperature between about 300° C. and about 425° C.

Other reactions which can be accomplished employing a catalyst comprising the composition of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

In order to more fully illustrate the nature of the invention and the manner of practicing same, the following example is presented.

EXAMPLE

Experiments A through J were carried out by following the following procedure. A pseudo-boehmite/H$_2$O slurry was mixed with an aqueous phosphorus source, H$_3$PO$_4$ (85 wt %) until a gel with smooth consistency was obtained at 25°-100° C. for 0-5 hours. The amine and quaternary nitrogen compound were mixed in the proportions indicated in Table 2, and then added to the Al$_2$O$_3$/P$_2$O$_5$/H$_2$O slurry and stirred for 0-5 hours at room temperature. Boron was added as boron oxide either (i) to the pseudo-boehmite, (ii) just before heating the gel, or (iii) half to the pseudo-boehmite and half just before heating the gel. Optionally silica was added as colloidal silica, fumed silica or precipitated silica just before heating the gel. The gel was then crystallized in an autoclave at 130°-150° C. for 1 to 500 hours and the X-ray diffraction pattern of the resulting product were obtained.

A summary of experiments A through J is set out in Table 2. The data show that complete substitution of B$_2$O$_3$ for Al$_2$O$_3$ (Experiment D) fails to yield any solid product. Substitution of 60 mole % Al$_2$O$_3$ with B$_2$O$_3$ (Experiment J) resulted in a dense phase material. The FIGURE shows the solid state $^{11}$B NMR spectrum for the product from Experiment E. The majority of boron is tetrahedrally coordinated with an $^{11}$B NMR shift of −0.97 ppm. BAPO-5 has an $^{11}$B NMR shift of −1.1 ppm according to Appleyard et al., Zeolites 6, 428, 1986 which indicates that tetrahedrally coordinated boron is located within the framework of the metalloaluminophosphate product of Experiment E.

TABLE 2

GEL COMPOSITION: R$_1$.R$_2$.xAl$_2$O$_3$.P$_2$O$_5$.yB$_2$O$_3$.40H$_2$O
(HEATED AT AUTOGENOUS PRESSURE
FOR 4 HOURS AT 142° C.)

| EXPERIMENT | R$_1$* | R$_2$* | x | y | ORDER | RESULT |
|---|---|---|---|---|---|---|
| A | DPA | — | 1.0 | 0.1 | I | MAPO + trace AlPO$_4$-11 |
| B | DPA | — | 0.9 | 0.1 | II | MAPO + trace AlPO$_4$-11 |
| C | DPA | — | 0.9 | 0.1 | I | MAPO + sml amt AlPO$_4$-11 |
| D | DPA | — | 0.0 | 1.0 | II | No solid collected |
| E | DPA | 1/60 TMA | 0.9 | 0.2 | III | Si-B MAPO + trace SAPO-11 (0.3 SiO$_2$ added after addition of final B$_2$O$_3$) |
| F | DPA | 1/60 TMA | 0.9 | 0.1 | I | MAPO + AlPO$_4$-11 |
| G | DPA | 1/60 TMA | 0.9 | 0.1 | II | MAPO + small amt of H3 (heated for 6 hrs) |
| H | DPA | 1/60 TMA | 0.8 | 0.4 | III | MAPO + trace AlPO$_4$-11 |
| I | DPA | 1/60 TMA | 0.6 | 0.4 | II | MAPO + trace AlPO$_4$-11 |
| J | DPA | 1/60 TMA | 0.4 | 0.6 | II | unknown (probably dense phase) |

**Mixing Order:
I: B$_2$O$_3$ added just before heating gel
II: B$_2$O$_3$ added to Al$_2$O$_3$
III: ½B$_2$O$_3$ as with I and ½B$_2$O$_3$ as with II
*DPA: dipropylamine
TMA: tetramethylammonium MAPO=Metalloaluminophosphate (containing framework boron) and having X-ray diffraction characteristics of Table 1A.

What is claimed is:

1. A method for synthesizing a metalloaluminophosphate composition comprising crystals having a framework topology after heating at 110° C. or higher giving an X-ray diffraction pattern with lines shown in Table 1A of the specification, which comprises (i) preparing a mixture capable of forming said composition, said mixture comprising sources of aluminum, phosphorus, one or more elements (M) other than aluminum or phosphorus said M comprising boron, water and a directing agent (DA) which contains at least one quaternary nitrogen compound and at least one amine in a molar ratio of total quaternary nitrogen compound to total amine ranging from 0.0 to 0.025, and water and having a composition, in terms of mole ratios, within the following ranges:

| | |
|---|---|
| M/Al$_2$O$_3$ | 0.01 to 0.4 |
| P$_2$O$_5$/Al$_2$O$_3$ | 0.5 to 1.25 |
| H$_2$O/Al$_2$O$_3$ | 10 to 100 |
| DA/Al$_2$O$_3$ | 0.5 to 1.5 | and (ii) maintaining the mixture under sufficient conditions until crystals of the desired crystalline composition are formed.

2. The method of claim 1 wherein said mixture has the following composition ranges:

| | |
|---|---|
| M/Al$_2$O$_3$ | 0.01 to 0.2 |
| P$_2$O$_5$/Al$_2$O$_3$ | 0.9 to 1.1 |
| H$_2$O/Al$_2$O$_3$ | 30 to 80 |
| DA/Al$_2$O$_3$ | 0.9 to 1.1 | and wherein said molar ratio of total quaternary nitrogen compound to total amine ranges from 0.010 to 0.020.

3. The method of claim 1 wherein said mixture has the following composition ranges:

| | |
|---|---|
| M/Al$_2$O$_3$ | 0.01 to 0.1 |
| P$_2$O$_5$/Al$_2$O$_3$ | 0.9 to 1.1 |
| H$_2$O/Al$_2$O$_3$ | 35 to 60 |
| DA/Al$_2$O$_3$ | 0.9 to 1.1 | and wherein said molar ratio of quaternary nitrogen compound to amine ranges from from 0.015 to 0.018.

4. The method of claim 1 wherein said crystals give an X-ray diffraction pattern with lines shown in Table 1B.

5. The method of claim 1 wherein said crystals give an X-ray diffraction pattern with lines shown in Table 1C.

6. The method of claim 1 wherein said forming mixture comprises a source of silicon.

7. The method of claim 1 wherein said amines are selected from the group consisting of mono-, di-, tri- or polyamines and said quaternary nitrogen compounds are ammonium compounds having the formula:

$$R_4N^+X^-$$

wherein R is alkyl of from 1 to 20 carbon atoms, heteroalkyl of from 1 to 20 atoms, aryl, heteroaryl, cycloalkyl of from 3 to 6 carbon atoms, cycloheteroalkyl of from 3 to 6 carbon atoms, or combinations thereof; and X is an anion.

8. The method of claim 2 wherein said amines are selected from the group consisting of alkylamines wherein alkyl is of 1 to 5 carbon atoms and trialkanolamines and said quaternary nitrogen compounds are ammonium compounds having the formula:

$$R_4N^+X^-$$

wherein R is alkyl of from 1 to 4 carbon atoms and X is halide or hydroxide.

9. The method of claim 3 wherein said amines are selected from the group consisting of di-n-propylamine, di-isopropylamine, di-n-pentylamine, di-isopentylamine, di-neopentylamine, tri-n-butylamine, tri-n-pentylamine, triethanolamine and tri-isopropanolamine and said quaternary nitrogen compounds are selected from the group consisting of tetramethylammonium, tetraethylammonium, tetrapropylammonium and tetrabutylammonium.

10. The method of claim 1 wherein said metalloaluminophosphate is made from a forming mixture which is a hydrogel containing sources of aluminum, phosphorus, boron, optionally, silicon; directing agent (DA), and water and having a composition, in terms of mole ratios, within the following ranges:

| | |
|---|---|
| $B_2O_3/Al_2O_3$ | >0 to 0.8 |
| $P_2O_5/Al_2O_3 + B_2O_3$ | 0.5 to 1.25 |
| $H_2O/Al_2O_3$ | 10 to 100 |
| $DA/Al_2O_3$ | 0.5 to 1.5. |

11. The method of claim 1 wherein said metalloaluminophosphate is made from a forming mixture which is a hydrogel containing sources of aluminum, phosphorus, boron, optionally, silicon; directing agent (DA), and water and having a composition, in terms of mole ratios, within the following ranges:

| | |
|---|---|
| $B_2O_3/Al_2O_3$ | 0.01 to 0.2 |
| $P_2O_5/Al_2O_3 + B_2O_3$ | 0.9 to 1.1 |
| $H_2O/Al_2O_3$ | 30 to 80 |
| $DA/Al_2O_3$ | 0.5 to 1.1. |

12. A metalloaluminophosphate composition comprising crystals having a framework topology after heating at 100° C. or higher giving an X-ray diffraction pattern with lines shown in Table 1A of the specification having the characteristic composition in the anhydrous state as follows:

$$(AlO_2^-)_{1-x}:(PO_2^+)_{1-y}:(MO_2^{m-4})_{x+y}$$

where M is B alone or B and Si having a valence m (weighted average) and wherein less than about 50% of the atoms of M are $Si^{-4}$, and x and y are numbers which satisfy the relationship:

$$z=y-x+(4+m)\cdot(x+y)$$

wherein z is a number of from greater than $-1$ to less than $+1$, said metalloaluminophosphate composition having an ion-exchange capacity of at least about 0.002 meq/g.

13. The recovered crystalline metalloaluminophosphate composition of claim 1.

14. The recovered crystalline metalloaluminophosphate composition of claim 2.

15. A catalyst composition comprising the crystalline metalloaluminophosphate of claim 13.

16. A catalyst composition comprising the crystalline metalloaluminophosphate of claim 14.

17. A process for effecting catalytic conversion of an organic compound-containing feedstock which comprises contacting said feedstock under catalytic conversion conditions with the catalyst composition of claim 15.

* * * * *

UNITED STATES PATENT AND TRADEMARK OFFICE
CERTIFICATE OF CORRECTION

PATENT NO. : 5,124,136

DATED : June 23, 1992

INVENTOR(S) : Mark E. Davis

It is certified that error appears in the above-identified patent and that said Letters Patent is hereby corrected as shown below:

Column 16, line 19, patent reads "$100^\circ C$" should read --$110^\circ C$--.

Column 16, line 28, patent reads "$Si^{-4}$" should read --$Si^{+4}$--.

Signed and Sealed this

Twenty-eighth Day of September, 1993

Attest:

BRUCE LEHMAN

Attesting Officer   Commissioner of Patents and Trademarks